United States Patent [19]

Clapper

[11] Patent Number: 5,544,906
[45] Date of Patent: Aug. 13, 1996

[54] HUMAN POWERED RECUMBENT VEHICLE

[76] Inventor: Lawrence D. (Jake) Clapper, 1120 Delno St., San Jose, Calif. 95126

[21] Appl. No.: 269,279

[22] Filed: Jun. 30, 1994

[51] Int. Cl.$^6$ .................................................. B62K 5/08
[52] U.S. Cl. .................... 280/288.1; 280/281.1; 280/282; 280/269
[58] Field of Search .................. 280/288.1, 281.1, 280/282, 263, 267, 259, 260, 261, 269

[56] References Cited

U.S. PATENT DOCUMENTS

| | | | |
|---|---|---|---|
| D. 290,451 | 6/1987 | Engum | 280/288.1 X |
| D. 301,130 | 6/1989 | Brummer | D12/111 |
| D. 304,319 | 10/1989 | Brummer | D12/111 |
| D. 327,040 | 6/1992 | Brummer | D12/111 |
| 2,789,831 | 4/1957 | Verik | 280/282 X |
| 3,429,584 | 2/1969 | Hendricks | 280/288.1 X |
| 4,079,957 | 3/1978 | Blease | 280/278 |
| 4,132,428 | 1/1979 | Lassiére | 280/281.1 X |
| 4,373,740 | 2/1983 | Hendrix | 280/269 |
| 4,432,561 | 2/1984 | Feikema et al. | 280/282 |
| 4,456,277 | 6/1984 | Carpenter | 280/282 |
| 4,497,502 | 2/1985 | Forbes | 280/282 |
| 4,634,137 | 1/1987 | Cocksedge | 280/282 X |
| 4,691,930 | 9/1987 | Samuel | 280/7.1 |
| 4,878,684 | 11/1989 | Lemle | 280/288.1 |
| 4,993,733 | 2/1991 | Eilers | 280/282 X |
| 5,263,732 | 11/1993 | Harmeyer | 280/288.1 |
| 5,284,355 | 2/1994 | Ishii | 280/282 X |
| 5,383,675 | 1/1995 | Liebert | 280/288.1 X |

*Primary Examiner*—Margaret A. Focarino
*Assistant Examiner*—F. Zeender
*Attorney, Agent, or Firm*—Jeffrey P. Aniello

[57] ABSTRACT

An improved human powered recumbent vehicle is provided. The vehicle includes a frame that comprises a central keel. The keel comprises four tubes that are spaced equidistant from a central longitudinal axis. Outrigger arms are disposed approximately halfway along the longitudinal axis of the keel and extend forwardly and outwardly therefrom. The angle that each outrigger arm forms with the keel, provides an access area that allows a rider access to the seat without having to step over any portion of the invented vehicle, for easy mounting and dismounting. Outboard ends of the arms terminate in pivotable connectors that may be provided for wheel bearing yokes. A rear section of the keel is wide enough to accommodate a wheel. The keel has a prow that terminates in a single plane, so that the vehicle can be placed on its prow for storage in an upright position, to minimize storage space. In a tricycle embodiment, a seat is secured to the top two tubes of the keel, adjacent the juncture of the arms with the keel. This improves the vehicle's balance control. The frame is fabricated using straight tubes, to provide ease of manufacture. In the tricycle embodiment, wheels are spring mounted to yokes provided at the ends of the outrigger arms. The frame is lightweight, easily adaptable to different size riders, and easy to manufacture.

10 Claims, 9 Drawing Sheets

HUMAN POWERED RECUMBENT VEHICLE

FIELD

The invention relates to human powered recumbent vehicles, and more particularly to an improved frame assembly for human powered recumbent tricycles, snowmobiles, ice boats and watercraft. The preferred embodiment is a human powered recumbent tricycle (HPRT) having two joint wheels and a single, driven rear wheel, the frame of which is characterized by the front wheels being journaled on the outboard ends of outrigger arms disposed at an angle to form a generally Y-shaped frame so that the rider can more easily mount and dismount the seat.

BACKGROUND

Both concern over health and the environment have led to interest in human powered recumbent vehicles. Long distance riding of regular bicycles is tiring not only in the arms and the posterior, but is also difficult for some people who find that the heads up position causing the neck to be bent backward results in pinched nerves. In addition, a three wheel recumbent type of cycle offers much increased safety from a stability point of view. An example of these advantages is set in a front wheel recumbent tricycle termed the Cyclodyne, disclosed in the Carpenter Patent 4,456,277.

Three wheeled recumbent human powered vehicles also offer many advantages from the point of view of energy consumption, particularly for third world countries as work vehicles.

In addition to the Carpenter cyclodyne and a small-wheel sport tricycle vehicle known as the Corsa, there is a wide variety of recumbent tricycles including the following: Forbes et al U.S. Pat. No. 4,497,502 shows a single front wheel, front drive HPRT in which the two rear wheels are steerable; Hendrix U.S. Pat. No. 4,373,740 shows a single rear wheel, rear drive HPRT in which the two front wheels are connected to a single crossbrace that prevents front access to the seat; Samuel U.S. Pat. No. 4,691,930 shows a push-type child's tricycle (1 front wheel, 2 rear) of modular construction that permits assembly into a variety of configurations; Feikima et al U.S. Pat. No. 4,432,561 shows a single front wheel front drive HPRT in which the front wheel is tilted, steered by shifting body weight relative to fixed rear wheels, and the crank is forward of the front wheel; Blease U.S. Pat. No. 4,079,957 shows a child's single front wheel tricycle that is convertible from a stranded high seat to a low rider (Big Wheel type), and the front wheel is directly cranked in both cases; Brummer U.S. Pat. No. Des 301,130; 304,319; and 327,040 all show various frames for recumbent bicycles, of which 304,319 has a single wheel rear drive with a crank forward of the front wheel; and Lemle U.S. Pat. No. 4,878,684 shows a rear drive recumbent bicycle with the crank intermediate the front wheel and seat, in which the seat is adjustable, and the vehicle is steered by under-seat handlebars.

The Carpenter Cyclodyne and the Corsa vehicle have the disadvantage in that the two front wheels are located on a cross axle or cross frame member which is well forward of the front lip of the user's seat. In essence these vehicles are very difficult to mount or dismount. For example, in order to mount the Carpenter cyclodyne one must step over the high lip of the fairing, place one foot on the center of the seat while holding the back of the seat, and then simultaneously turn the body down into the seat.

Accordingly, there is a need for improved framing systems for human powered vehicles that permit ease of entry and exit, are strong, lightweight and permit adaptation to a wide variety of vehicle systems, including tricycles, water and ice craft and snow craft.

THE INVENTION

OBJECTS

It is among the objects of this invention to provide an improved frame system for recumbent human powered vehicles which permits the users/operator to mount and dismount in a natural, safe, easy and fast manner.

It is another object of this invention to provide a recumbent human powered vehicle that has improved balance and control of balance through arrangement of the framing system, particularly the location of the juncture of the arms with the central keel of the frame.

It is another object of this invention to provide an improved human powered recumbent tricycle that is simple to manufacture, strong, lightweight and which is adaptable for a wide variety of uses, including exercise/recreational use, racing, and utility vehicle, the latter particularly for third world countries.

It is another object of this invention to profile human powered recumbent vehicles, including tricycles with two front wheels and one rear, ice "boats", watercraft, and snowmobiles.

It is another object of this invention to provide a framing system for a recumbent vehicle which includes a special prow assembly that permits the vehicle to be stored in an upright position, prow down, thereby reducing storage space.

Still other objects will be evidenced from the specification, descriptions, claims and drawings of this application.

BRIEF DESCRIPTIONS OF DRAWINGS

SUMMARY

Figure 1:
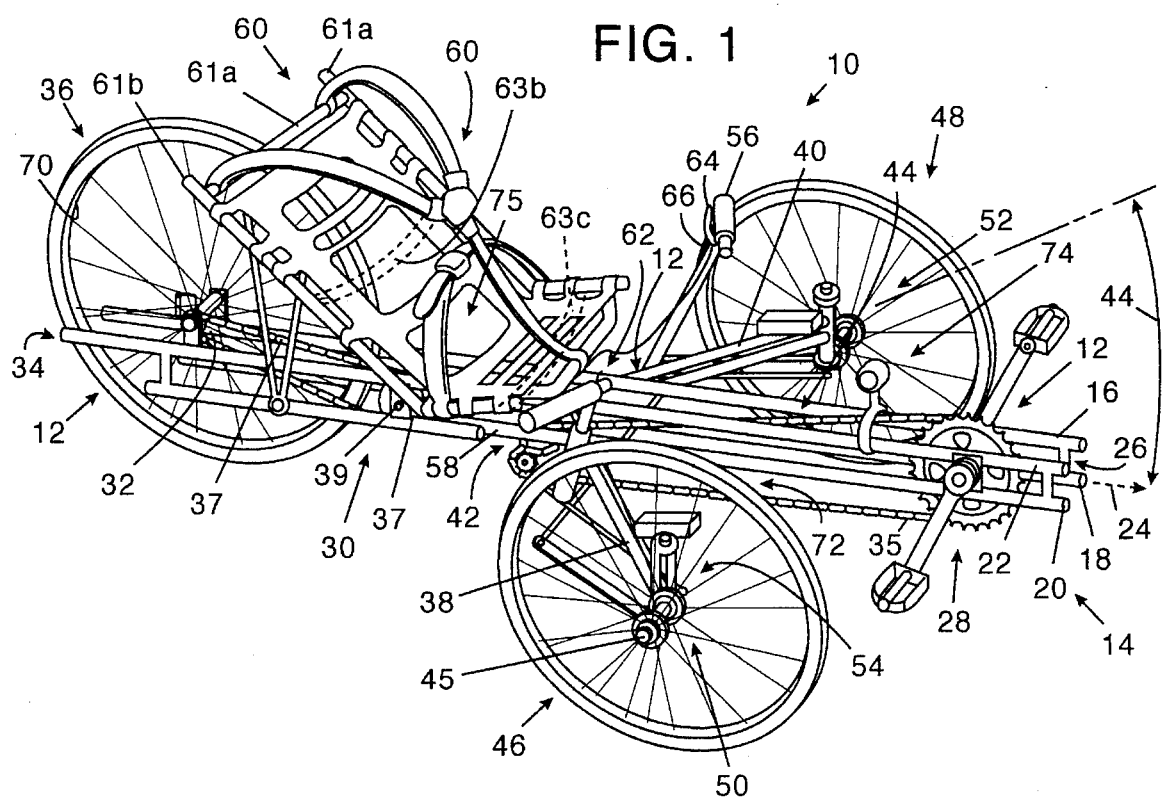
FIG. 1 is a three quarter elevated isometric right front view of a human powered recumbent vehicle employing the framing system of this invention.

The invention comprises an improved framing system for recumbent human powered vehicles, and its use in a variety of such vehicles, including but not limited to recumbent human powered tricycles, watercraft, snowmobiles and ice boats.

The structural frame includes a central keel subassembly having four tubes, arranged in a parallel array and equidistantly spaced from a longitudinal central axis. There is a front section and a rear section of the keel, which sections overlap with the front section tubes being spaced just inwardly of the rear section set of 4 tubes. In cross sectional configuration, the tubes are most advantageously arranged at the four corners of a square, but may also be arranged to form a rectangle or trapezoid. The central keel forward subassembly, in the preferred embodiment, has all four tubes of the same length so that they all terminate in a single plane transverse to the longitudinal access. This forms a planar prow or nose on which the vehicle may be stored upright. At a position centrally located between the forward "nose" and the aft "rear" end of the central keel, a pair of outriggers are secured to the forward set of tubes. The outriggers angle forward and outward, and may be terminated in a variety of different kind of fastenings, depending on the intended use of the frame. The presently preferred embodiment is a tricycle with two forward wheels and one rear wheel.

When the vehicle is in the stored position resting on its nose, the frame is in the general shape of the "peace symbol", that is, the frame forms an inverted Y with the stem of the Y extending downwardly beyond the outer termination of the Y arms.

The rear 4-tube section of the central keel in its preferred embodiment overlaps the forward section and is welded thereto. It is preferred to use cross-bracing for reinforcement at this overlapping transition zone of the outer keel. The upper two tubes of the rear keel section, located outward from the forward keel section, extend rearward approaching the extremity of the rear wheels. A bearing bracket is located adjacent the rear termination of the keel rear section into which the axle for the rear wheel is journaled. In an alternate embodiment, instead of welding straight tubes at the transition, the central keel can be extended backward and flared at the cross-bracing transition point, or the forward section can be just as wide as the rear section, with continuous straight tubes from fore to aft being used.

Each outrigger arm is preferably constructed of a pair of tubes, one placed above the other, each of which is welded to the longitudinally-extending central keel forward section (the outer pair) of side tubes. The outrigger arms extend outwardly at a 45° angle. A vertical tube, which functions as a reinforcing member, is used to join the keel tubing at the point of juncture of the outrigger arms.

A seat frame assembly is mounted on the top two forward section keel tubes, and typically has a four/aft range of movement on the order of 6 inches. The fore/aft adjustment capability is limited so that the center of balance is generally maintained around the intersection of the outrigger with the center keel. This means that the weight of the user is maintained at the inboard end of the outrigger arms so that maximum leverage for balance control is established with respect to the outrigger arms.

In addition, having the outrigger arms intersect beneath the seat location, and not providing a full width axle for the front wheels, permits the user to easily access and be seated on the vehicle seat or dismount therefrom. This is easily accomplished simply by stepping back to the seat and sitting down. In prior art devices, the seat is located far back from the intersection of the transverse axle or cross arms with the frame, making mounting from the front difficult at best, and often requiring access from above, causing mounting and dismounting to be awkward, very difficult, and even dangerous. The ease of access provided by the present invention is due to the fact that there is no transverse axle in the vehicle of this invention. It is rear wheel driven and the front wheels are independently mounted on the outer ends of the outrigger arms. In contrast, in the prior art Carpenter cyclodyne and Corsa vehicles, the intersection of the wheel axle or the cross piece is 90° to a central axis. The seat is well behind that intersection causing the vehicle to be less stable. In addition, the lever arm is shorter resulting in the control thereof to be less efficient and more sensitive. Since the seat in these prior art vehicles is so far back, the user must fall back onto the seat or try to access it from one side or the top.

Mounted on the outboard ends of the outrigger arms are appropriate couplings. For example, in the case of the preferred embodiment of a recumbent human powered vehicle, the outrigger arms terminate in a vertically oriented yoke which is pivotable on a vertical axis, and to which a bicycle hub-type axle is rotatably mounted on a horizontal axis. The wheel is mounted on the hub in the usual manner. In one embodiment, a disc brake is mounted on the hub between the yoke and the wheel. The yoke is pivoted on its vertical axis by a pin which is journaled in a tube at the outboard end of each outrigger arm. The yoke is generally vertically larger than the length of the outrigger end-tube, and a spring may be used coaxially around the vertical pin and below the outrigger end tube as a shock absorber.

The seat itself may be of any appropriate construction, such as a rigid plastic, but the preferred embodiment is a mesh fabric seat which is attached to an open frame so the entire seat assembly is strong and lightweight. Appropriate safety belts as needed can be attached to the seat frame. The seat back is preferably braced by struts to the lower right and left tubes of the rear keel subassembly.

The seat frame is preferably a spaced pair of generally J-shaped tubes with cross-bracing at the shoulders, back and seat, but not at the forward end. The rear (shoulder section) of the frame is tilted back so that there is a relatively high forward lip to prevent forward sliding (submarining) of the rider. The mesh seat is slung by appropriate straps from the side tubes so that there is a prominent seat pocket which contours itself to a wide variety of rider physiques. There is no front cross-brace between the side J-tubes so that there is no chafing of the gluteus muscles during riding. Rather the flexible seat mesh permits good leg motion without rider chafe.

Journaled in a pair of spaced bearing blocks just aft of the forward end of the prow of the keel is a crank and gear assembly. This is connected by a front forward chain to a set of transfer gears located behind the seat, typically in the keel transition section. From thence a second chain goes to a sprocket on the rear wheel. In the preferred embodiment, the forward crank and gear employs a single gear ring, of 48 to 26 teeth, and the chain extends to a pair of transition gears, the drive being 24 to 22 teeth. No derailleur is required for this preferred embodiment as the vehicle is intended to be a basic, bare bones vehicle. The driver transition gear in turn drives a 3-speed Sturmy-Archer or Sacks-type rear wheel hub with coaster brake. The gear shift control is located on one of the steering handles or along-side one of the seat J-tubes.

However, for other than a basic vehicle, a more complex gearing system may be used. For example, the crank and gearing system in the front may be in this embodiment: a multi-sprocket conventional bicycle main crank sprocket assembly (e.g. 3–7 gear ring sprocket assembly) which may be used with a standard derailleur mounted between the seat and the forward crank to activate a multiple gear transfer assembly. Additionally, if desired, a conventional multiple-gear rear hub assembly may be employed in conjunction with a rear wheel derailleur. Typically, the number of gears can permit from three to fifty different gearings/speed ratios. Table I shows a variety of choices.

TABLE I

TYPICAL GEARING CHOICES

| Type/System | Front Crank | De-railleur | Transfer | De-railleur | Rear |
|---|---|---|---|---|---|
| Basic | Single | None | 2 | None | 3-Speed *SA |
| Intermediate (Touring) | 5 | Yes | 3 | None | Single |
| Complex (Mountain or Racing) | 5 | Yes | 3 | Yes | 3 |

*SA = Sturmy Archer 3-speed hub.

The steering is accomplished by throw arms and cross linkages which are pivotably secured to the bottom ends of lever arms mounted on braces extending rearwardly of the outriggers adjacent the seat. The two levers are linked so that upon pulling backward on the right lever, the left lever goes forward and the wheels are turned to the right, as seen by the seated operator. To turn left, the right lever is pushed forward and the left lever is pulled backward.

The braking may be any conventional bicycle type braking, such as rim caliper brakes, discs with calipers, Bendix-type safety hubs (incorporated in the SA rear hub), or rim brakes. A single brake may be used on the rear wheel with the cable actuating lever mounted on the right or left-hand steering arm. The actuating lever for the front wheel brakes, which if desired are preferred to be caliper disc brakes, is conveniently mounted on the opposite steering lever.

The seat crosspiece has two semi-circular guides that rest on the upper left and right forward keel section tubes. To adjust the seat, locking nuts or clamps are released on the guide fittings under the seat, and the seat strut clamps are released from the bottom keel tubing. Then the entire seat/strut assembly is slid forward or back to accommodate the length of the operator's legs and the clamps re-tightened.

It is preferred to limit the seat longitudinal adjustment to approximately plus or minus 6 inches fore and aft of the outrigger intersection in order to maintain the balance point of the framing system. If this adjustment does not prove sufficient, the frames may be provided in 2 or 3 basic sizes, short, standard and long, in which respectively, the distance of the front crank bearing bracket transverse center line to the outrigger intersection are typically 20 inches, 23 inches and 26 inches. While it is preferred that the crank bearing bracket be permanently welded to the respective upper and lower side tubes of the keel forward section, the bearing bracket may be made adjustable with appropriate removable fasteners.

Note that in the preferred embodiment the framing tubing is straight, and no complex bending is required. This is for ease of manufacture. The jigs are simple and the welding is simple. Further, the absence of bends eliminates stress points and preserves the tubing integrity. The preferred keel tubing is 4/30 aircraft grade chrome-moly steel, 7/8" diameter OD tubing with wall thickness of 0.038 inches. The tubing is heliarc welded. The bearing brackets are high strength steel and the yokes are aircraft grade high strength aluminum. The axles are preferably 303 stainless steel. The total weight of the frame is about 12 pounds and the total weight of the entire vehicle, including seat and wheels is under 40 pounds.

Splash guarding, preferably of rip stop nylon, or stretch nylon fabric may be rigged to the frame for rainy weather use. A stretch nylon fabric is preferably used in the front splashguard webbing so that the rider can stretch the fabric backward in the process of backing toward the seat to sit down. Or, the rider can simply step onto a fabric with enough downward stretch to touch the ground.

While a variety of wheel sizes and types may be used, it is preferred to have a larger rear wheel and smaller front wheels. The rear bearing block includes a number of holes for vertical adjustment of the rear wheel to accommodate different sizes of wheels and to adjust clearance and angle of the frame to the ground. The preferred wheel sizes for overall usage are 26" rear and 20" front. For hill and high speed racing, the preferred is 26 inch rear wheel and 16 to 18 inch front wheels. For shorter riders or children, the rear wheel can be 20, 22 or 24 inches and the front 14, 16, or 18".

Forward facing lights can be placed on the outrigger arms adjacent the outboard end, and a rear brake light can be placed on either side of the rear wheel, mounted on the right or left upper keel rear tubing. In addition, the rear bearing brackets include a number of holes for mounting standard bike racks for carriage of packages, saddle bags and the like. Fenders may be provided for the wheels mountable in the standard manner to the respective axles and the top tubes for the rear wheel (on the outside) and yokes on the inside (for front wheels).

DETAILED DESCRIPTION OF THE BEST MODE

The following detailed description illustrates the invention by way of example, not by way of limitation of the principles of the invention. This description will clearly enable one skilled in the art to make and use the invention, and describes several embodiments, adaptations, variations, alternatives and uses of the invention, including what we presently believe is the best mode of carrying out the invention.

Figure 2:
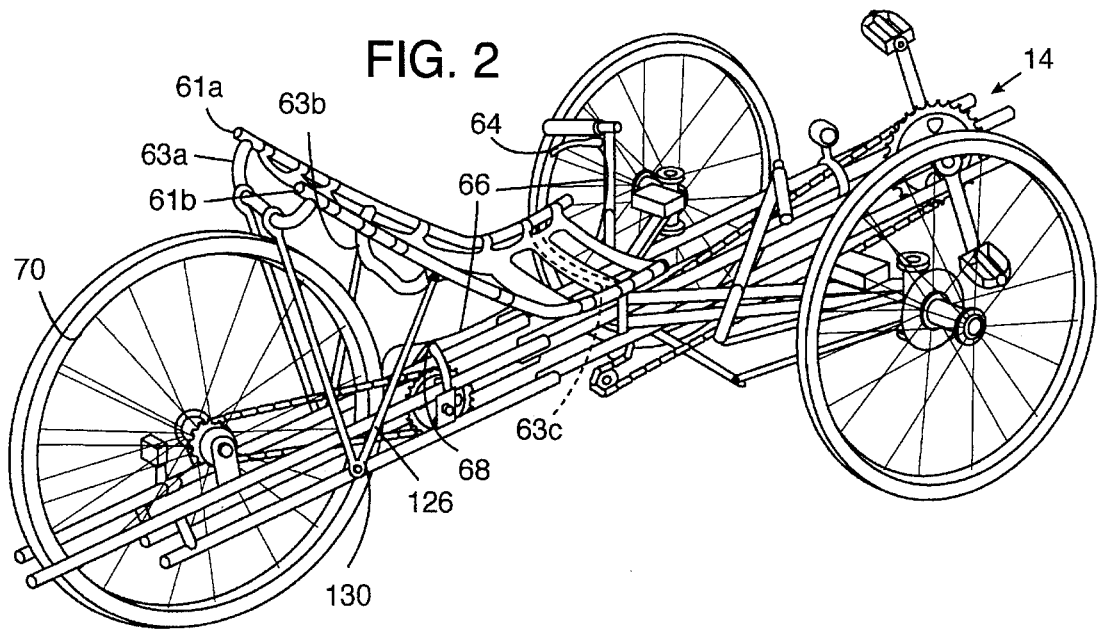
FIG. 2 is a right rear elevated isometric view of the recumbent vehicle of FIG. 1.

Referring now to FIGS. 1 and 2 of the drawing there is shown a preferred embodiment of the present invention as applied to a human powered recumbent tricycle 10. Frame 12 includes a central keel 14 constructed from four tube assemblies 16, 18, 20 and 22 spaced equidistant from a central axis 24. As described in more detail below the keel may be in multiple sections or a single continuous unit from front to rear. Mounted near a front end 26 of the keel 14 is a sprocket and crank assembly 28 interconnected through a chain and gear 30 to a rear drive sprocket 32 mounted at a rear end 34 of the keel 14 for driving a rear wheel assembly 36. Included in the assembly 30 are chains 35 and 37 and an intermediate transfer sprocket assembly 39. Two outrigger arms 38, 40 are attached to and extend outward from the keel 14 at a position 42 between the front and rear ends 26 and 34. The arms 38 and 40 extend from the keel 14 at an angle 44 (FIG. 1 and 6) projected towards the front end 26. Front wheel assemblies 46 and 48 are pivotably mounted at outboard ends 50 and 52 of the outrigger arms 38 and 40. Angle 44 is preferably 45° but may range from about 35°–50°. A steering assembly 54 with handle grips 56 and 58 is shown connected to the front wheel assemblies 46 and 48. A seat 60 is mounted in front of the rear wheel assembly 36 just behind the juncture of the outrigger arms to the keel. The seat is connected to the keel 14 through an adjustable mounting 62 allowing for a range of positioning along the axis 24. A brake handle 64 is shown interconnected through a brake linkage system 66 to a caliper 68 (see FIG. 2) acting on the rim 70 of the rear wheel assembly 36. Alternately, calipers or disc brakes can be mounted in association with the front wheels.

The arrangement of outrigger arms 38 and 40 extending forward at angle 44 puts the front wheel assemblies 46 and 48 in a forward position for vehicle stability and at the same time allows for access of a rider 71 (FIG. 3) to the seat 60 from the front of the vehicle at locations 72 and 74 between the outrigger arms 38 and 40 and the keel 14.

Figure 3:
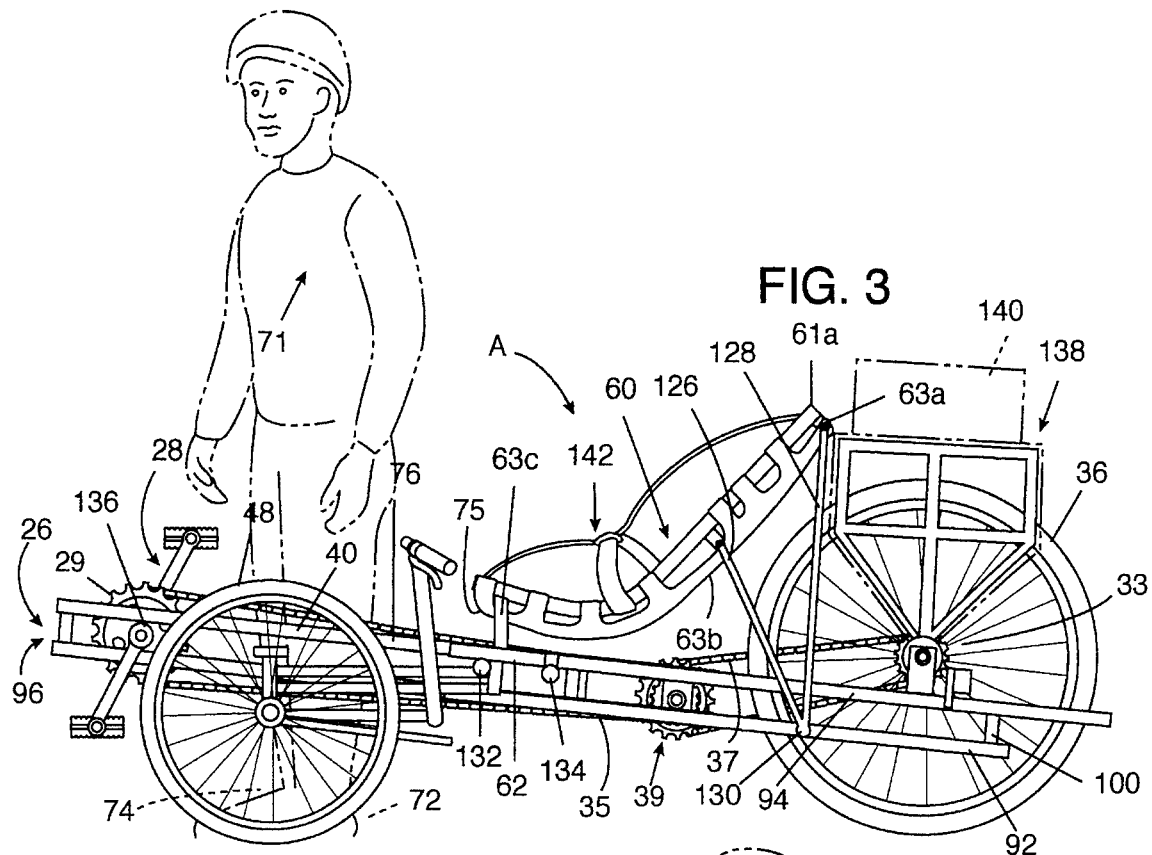
FIG. 3 shows an isometric side elevated view of the framing system of this invention illustrating the position of the rider (in phantom) accessing the seat and showing the preferred gearing embodiment.
Figure 4:
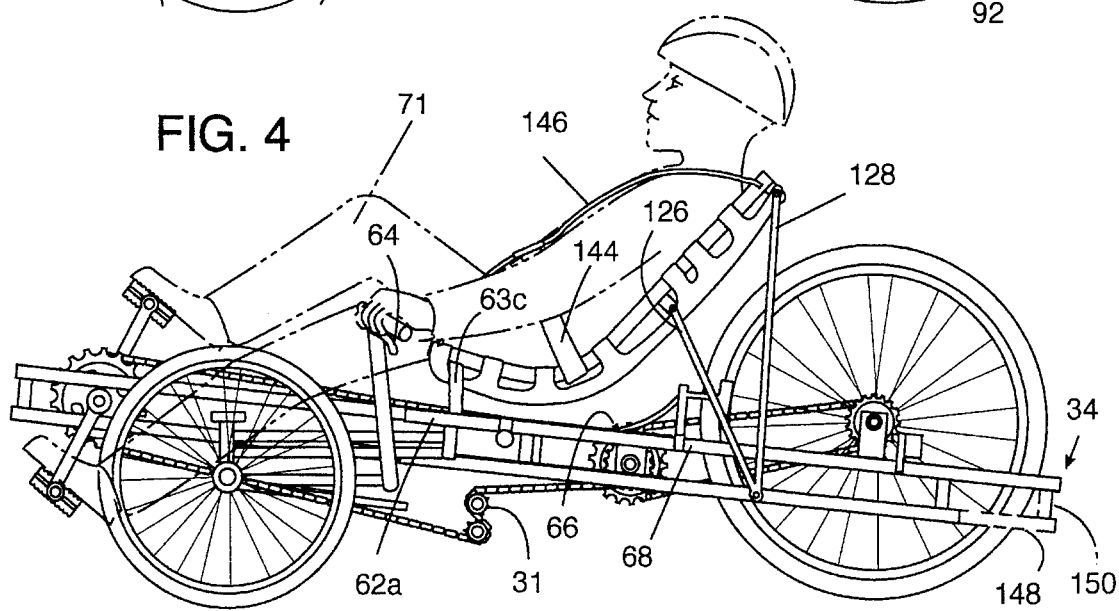
FIG. 4 is a side elevation showing the recumbent vehicle in its normal operating position with a rider in place.
Figure 6:
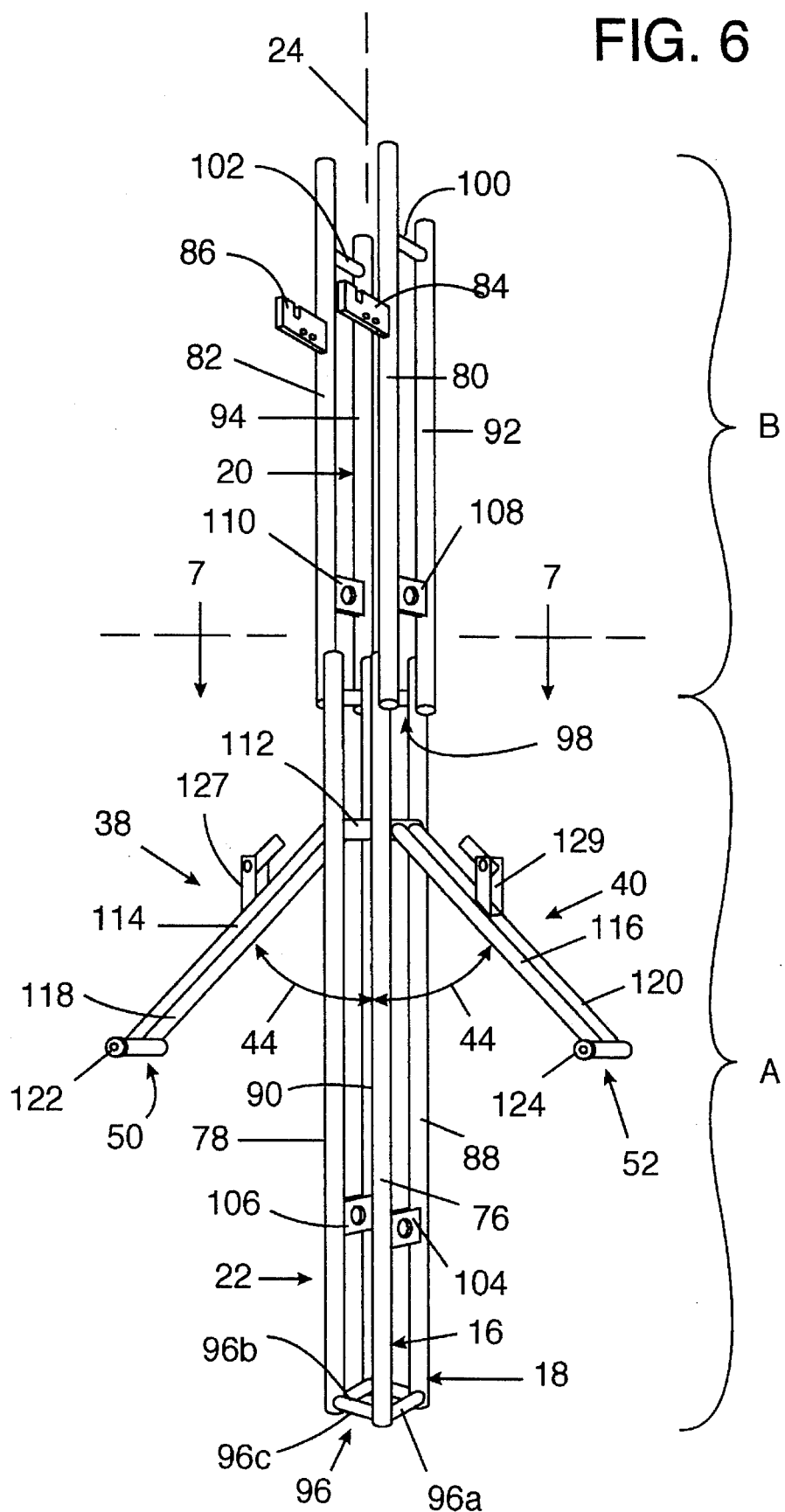
FIG. 6 is a side elevated isometric view of the frame only.

As can be seen best in FIGS. 3, 4 and 6, rider 71 is able to back into the seat 60 because the outriggers 38 and 40 diverge from keel connector position 42 to provide an access angle 44. FIG. 3 shows the rider 71 positioned standing with his feet at positions 72, 74 in the access angle area 44. The rider can back up until his calves touch the front lip of the seat material 75, and can then sit easily on the seat, as shown by arrow A in FIG. 3, with the riding position shown in FIG. 4.

FIG. 3 also shows the preferred gearing and wheel set up, with a single sprocket 29 driving front chain 35 which engages the transfer sprocket (a 2-gear ring transfer assembly) 39. In turn rear chain 37 connects to a 3-Speed Sturmy-Archer or equivalent rear hub 33. Typically, this type of hub includes an internal Bendix-type safety brake so that reversal of crank direction engages the internal hub brake.

FIG. 3 also illustrates the adjustable strut system for supporting the back of the seat. There are a pair on each side, forward strut 126 and rear strut 128 connected at one end either to the J-shaped side tubes 61 of the seat or to the back cross tube 63b or the shoulder cross tube 63a as shown. They are secured at the other end to one or both of the keel tubes, lower tube 92 or upper tube 94 (or both) by an adjustable mounting 62. To adjust the seat, the under seat clamps 132, 134 and strut clamps 130 are loosened and the seat slid forward or back on upper tubes 76, 78 (See FIG. 6), and re-tightened when the seat to crank length is optimum for the rider. Optionally or additionally the crank bearing blocks 136 can be adjusted forward or back, in which case the chain can be lengthened or shortened as needed, or a travelling tensioner can be employed to provide for chain length adjustment (not shown).

FIG. 3 also illustrates the preferred wheel size for the basic HPRT configuration with front wheels 48 being 20" and rear wheel 36 being a 26" wheel.

FIG. 3 also shows a rear rack assembly 138 for carrying saddle bags or packages 140. If needed, a rider safety belt system 142, comprising one or more of a seat belt 144 and/or a shoulder belt 146. FIG. 4 shows the belts in use.

FIG. 4 also shows the use of a derailleur 31 for the optimal chain drive set up. Note also the lower rear keel section tubes can be extended at 148 to behind the rear wheel 36 and an H-brace 150 like brace 96 at the front, can be used to cross-brace the rear end 34. In the alternative, the vehicle can be stood on its rear end for storage, or a suitable faring secured thereto.

Figure 5:
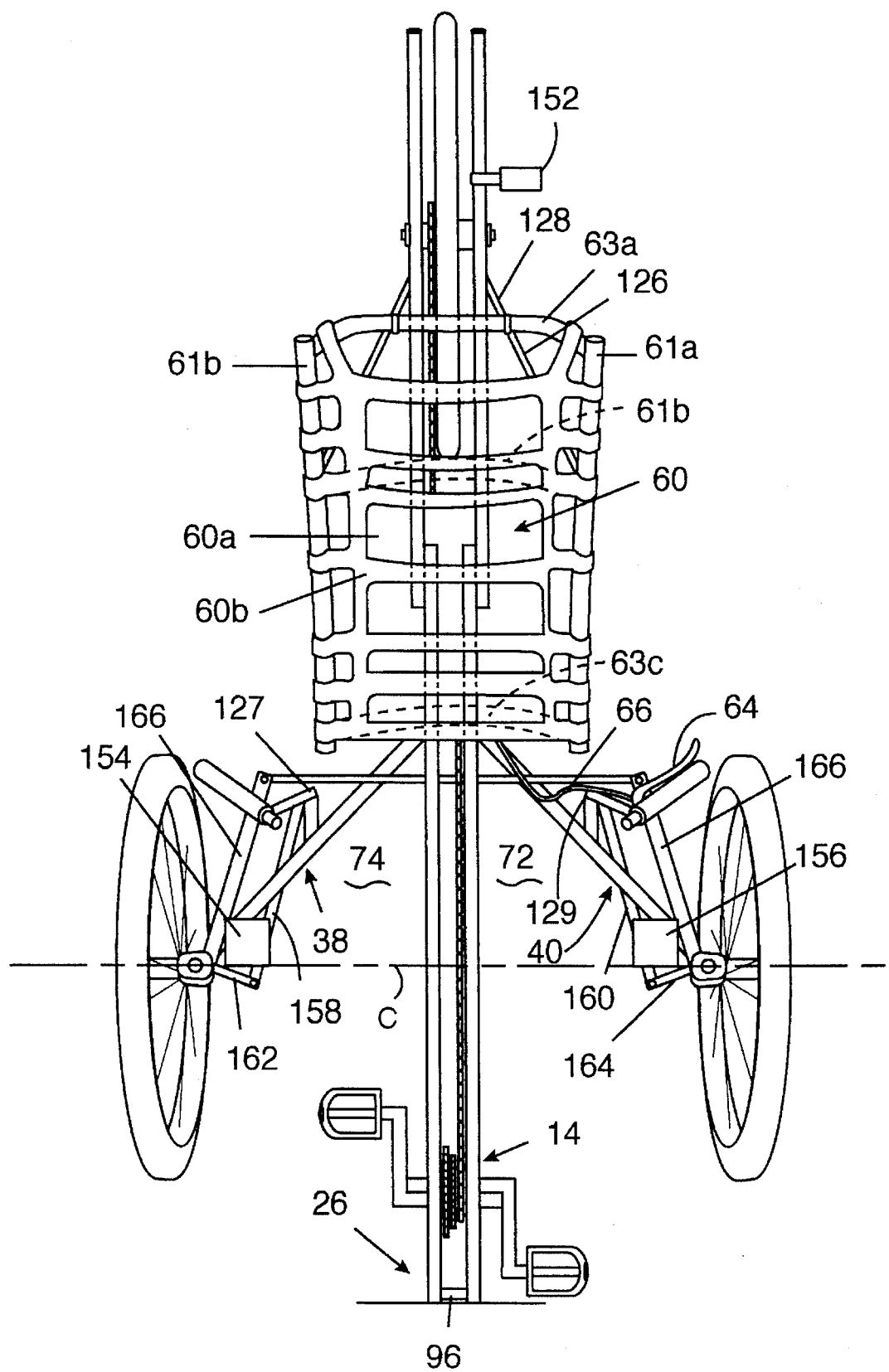
FIG. 5 shows the vehicle in its storage position standing upright on its prow.

FIG. 5 illustrates in elevation (and also in plan view) typical open mesh fabric 60a and webbing 60b of the seat 60, with the webbing or straps secured around the side tubes 61a, 61b and the end cross braces 63a and 63c of the seat assembly frame. Considered as plan view, FIG. 5 also illustrates where the rider places his/her feet at positions 72 and 74 when mounting or dismounting the seat 60, which position is well behind the axis C passing through the front wheel hubs on axis. This position is permitted by the diverging outrigger arms 38, 40. Considered as an elevation, FIG. 5 shows how the vehicle is storable on the front end 26 of the keel 14. FIG. 5 also shows rear running or brake lite 152 and front lights 154, 156. The battery and wiring (not shown) are conventional and can be secured to the keel, seat outrigger or rack in any convenient place. Alternatively, a generator can be used.

Figure 7:
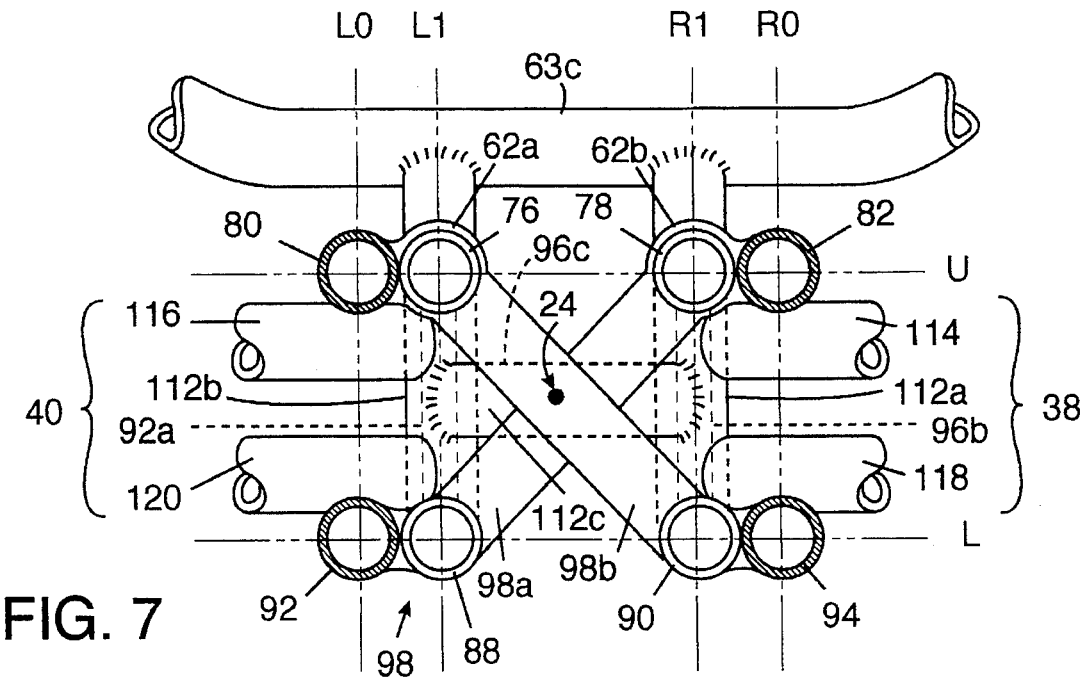
FIG. 7 is a sectional view showing the framing transition along the line 7—7 of FIG. 6 and the cross-bracing at the forward, overlapping transition section of the main central keel portion of the frame.

The detail of the frame 12 is more clearly shown in FIGS. 6 and 7 showing the keel 12 with the four-tube assemblies. In this preferred embodiment each of the tube assemblies 16, 18, 20 (See FIG. 6) and 22 of the keel assembly is in two sections, a forward section A and rear section B. The forward section A includes upper front tubes 76 and 78 integrally attached to tubes 80 and 82 respectively of the rear section B. Each of the rear tubes 80 and 82 have upwardly projecting rear wheel axle mounting brackets 84 and 86 for mounting the rear wheel assembly 36 (FIGS. 1 and 2). The forward section A also includes lower tubes 88 and 90 attached to rear tubes 92 and 94, respectively of the rear section B. The four tube assemblies are all interconnected by spacer supports 96 and 98. Additionally, tube pairs 80 and 92, and 82 and 94 are each interconnected by vertical support spacers 100 and 102 near the rear end 34, which allows longitudinal access for the rear wheel assembly 36 therebetween.

Front tube pairs 76 and 88, and 78 and 90 each have sprocket assembly mounting plates 104 and 106 attached for mounting the sprocket and crank assembly 28 (of FIG. 3) thereto. In addition, transfer sprocket mounting plates 108 and 110 are mounted between the rear tube pairs 92 and 80, and 94 and 82 respectively for mounting the transfer sprocket 39 (of FIG. 3). Further support of tube assemblies 16, 18, 20 and 22 is given by a support 112 at the point where the outrigger arms 38 and 40 join the keel 14.

The outrigger arms 38 and 40 have upper tubes 114 and 116 and lower tubes 118 and 120 attached to front tubes 78 and 76, and 90 and 88 respectively. The outboard ends 50 and 52 of outrigger arms 38 and 40 have cylindrical steering bearings 122 and 124. Between the outboard ends 50 and 52 and the keel 14 are shown steering arm pivot mounts 127 and 129. As best seen in FIG. 5 the steering linkage includes steering pivot links 158, 160, control arms 162, 164, and 3-element transfer linkage 166.

FIG. 7 is a section in elevation taken along line 7—7 in FIG. 6, i.e. looking from the rear to the front to show the cross bracing, which comprises a spacer support 98 in the form of X bracing at the transition (overlap) point of the front and rear sections A and B of keel 14 (FIG. 6) and lateral support 112 and spacer support 96 in the form of two H braces, one at the front 26 (which is entirely in phantom but can be seen in FIG. 6), and one at the juncture 42 (of FIG. 1) of the outriggers with the keel 14. Accordingly, what can be seen in FIG. 7 is the transition X brace tubes 98a and 98b which span, respectively, the Section A tubes 88 to 78 and 76 to 90. The outer Section B tubes are as follows:

Welded thereto upper left outer 80 (ULO) to upper left Inner 76 (ULI); upper right outer 82 (URO) to upper right inner 78 (URI); and likewise lower left outer 92 (LLO) to lower left inner 88 (LLI); and lower right inner 90 (LRI) to lower right outer 94 (LRO). Note the 4 upper tubes 80, 76, 78, 82 are in the horizontal plane marked "U" and the tubes 92, 88, 90 and 94 are in the horizontal plane marked "L", while the 4 sets of vertically aligned tubes are in vertical planes "LO" (80 and 92), "LI" (76 and 88), "RI" (78 and 90), and "RO" (82 and 94), respectively. The left outrigger arms 116 and 120 are seen secured to vertical tube 112b of H brace 112; while right outrigger tubes 114,118 are secured to vertical tube 112a of H brace 112, and the crossbar is 112c. The semicircular seat adjustment clamps 62a and 62b ride on tubes 76 and 78 respectively, and front seat cross brace 63c is secured thereto. The front H brace 96a, b, c is in phantom directly behind the H brace assembly 112 while H brace assembly 96 is oriented coordinate with H brace 112, it would be oriented at 90° F., as an "I" brace. The X brace would be replaced with an H or I brace.

Figure 8:
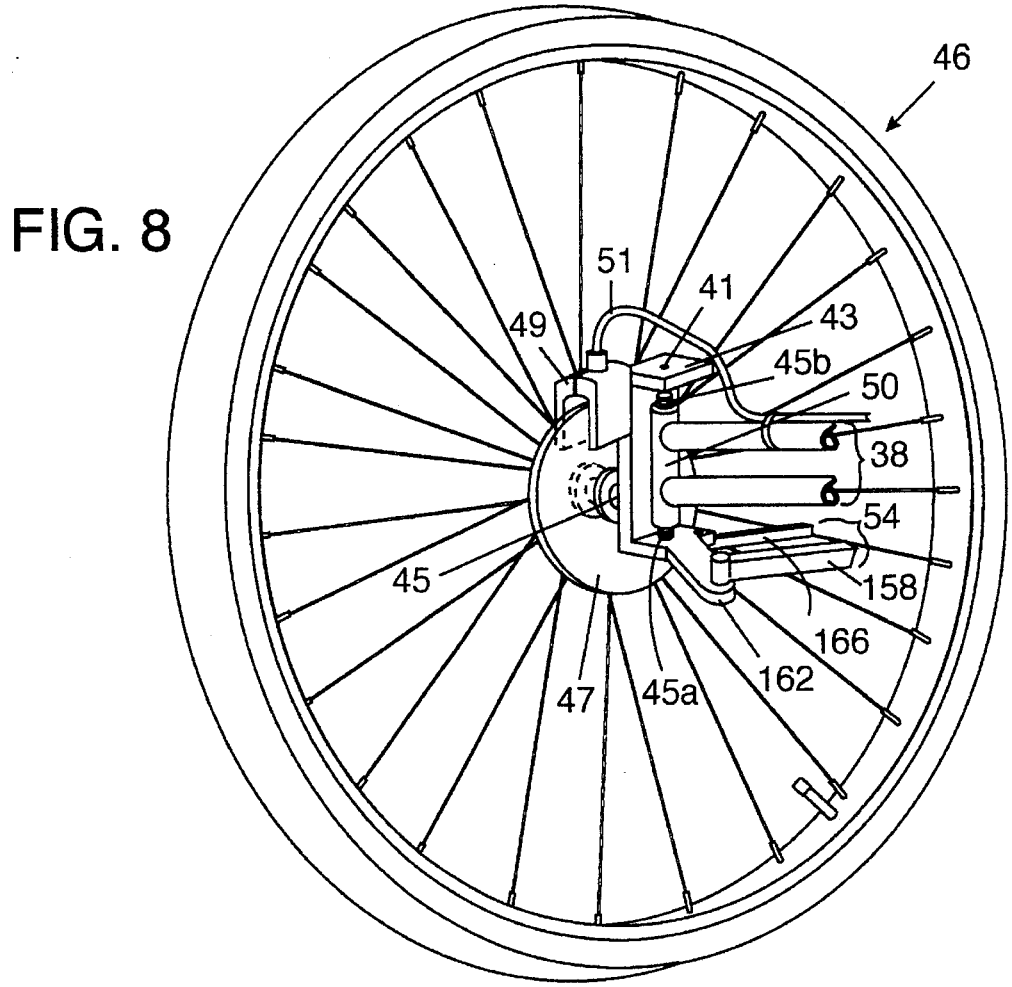
FIG. 8 is an isometric view of one embodiment of a front disc brake which may be used in conjunction with the tricycle embodiment of this invention.

FIG. 8 shows in isometric elevation the outboard end of outrigger arm 38, which terminates in vertical bearing tube 50. Journaled in the tube 50 is vertical pin 41 secured in the axle C-Bracket 17 yoke 43, which is secured by the control arm 162. The transfer linkage is 166. One or more compression springs 45a, 45b may be employed journaled on pin 41 between the upper and lower ends of bearing tube 122 and the inner face of the axle yoke 43. The wheel assembly 46 optimally includes a disc brake assembly secured thereto, which comprises a caliper 49 secured to axle yoke 43, actuated by brake cable 51 leading from a handbrake lever on the right hand grip 58 (not shown).

Figure 9:
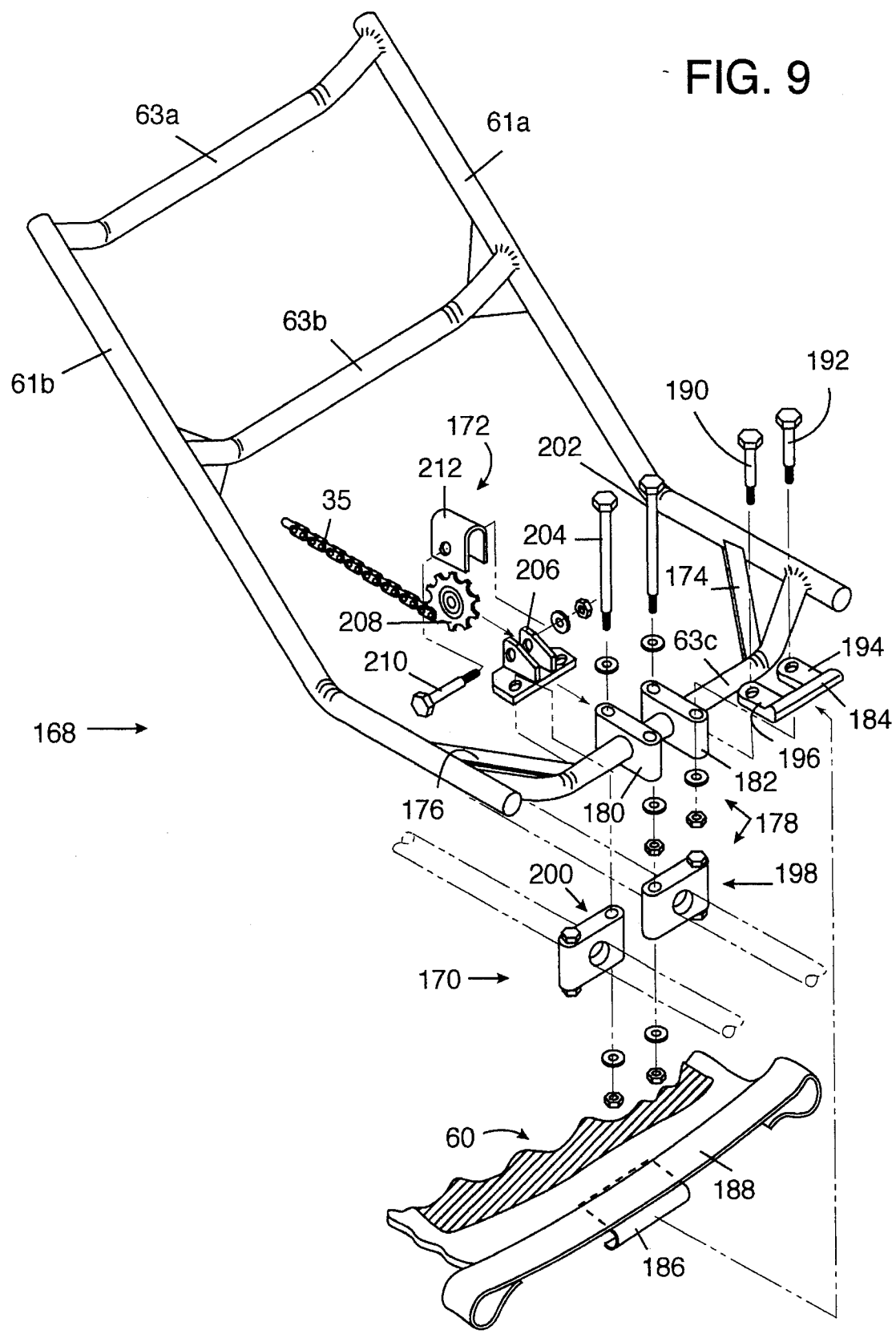
FIG. 9 is a front exploded isometric of the seat mount bracket and chain guide assembly.

FIG. 9 illustrates the preferred seat frame assembly 168, and a combined seat clamp assembly 170 and chain guide assembly 172. Seat side rails 61a and 61b are joined by cross braces 63a, 63b and 63c. The forward cross brace 63c can be reinforced by diagonal braces 174 and 176 as shown. The seat assembly is adjustably secured to the top tubes of the keel by clamp assembly 178. The clamp assembly comprises a pair of crossbrace clamps 180 and 182, which may be unitary pieces slipped onto the cross brace tube 63c before bending and welding to the seat side rails 61a and 61b, or may be split as shown. At the forward end of the crossbrace clamps a seat catch 184 is bolted. The catch spaces the crossbrace and receivingly engages clip 186 which is secured to the front cross strap 188 of the web seat 60. The catch 184 is secured by bolts 190 and 192, the heads of which can be recessed in the rear facing tanges 194 and 196 of the catch.

The cross brace clamps in turn are secured to a pair of keel top tube clamps 198 and 200 by bolts 202 and 204. The keel clamps are preferably attached aft of the juncture of the outrigger arms with the keel.

Optimally the chain guide assembly 172 is secured to span the crossbrace clamps 180 and 182. The U-shaped base upstanding flanges 206 between which a toothed idler wheel 208 is journaled on shaft 210. A protective cover 212 may be used to prevent the seat fabric from becoming worn by the rotation of idler 208. The idler keeps the chain 35 depressed as it passes by the front of the seat and promotes proper chain tension.

Figure 10:
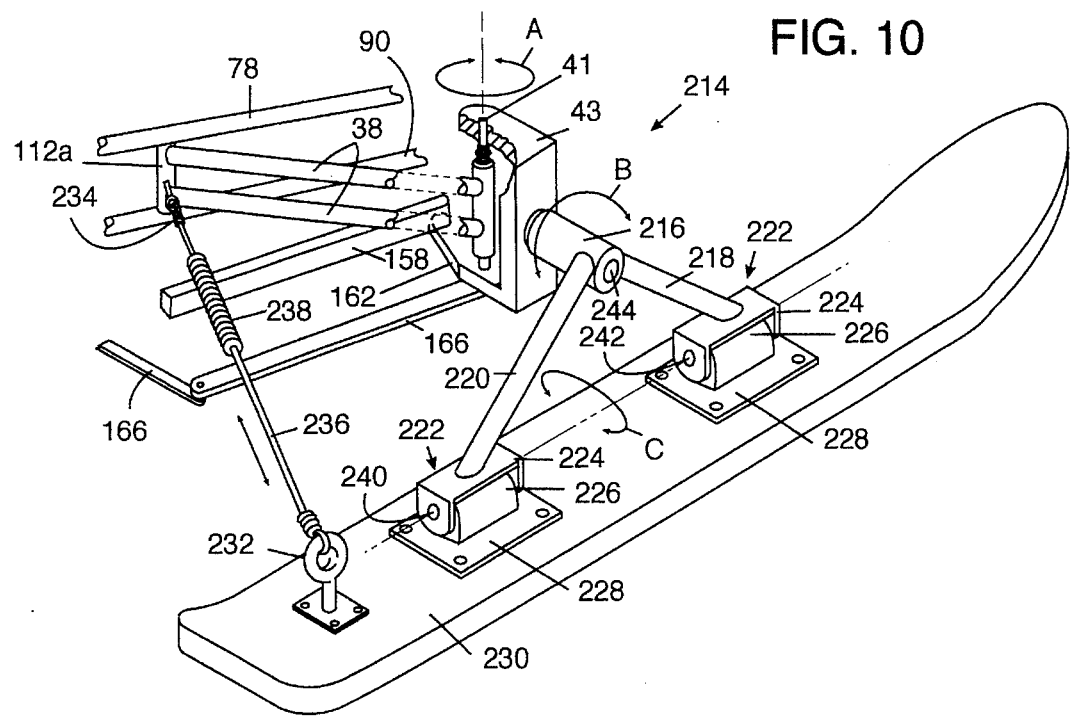
FIG. 10–12 show the frame assembly of the present invention employed on a human powered recumbent vehicle adapted for snow.
Figure 11:
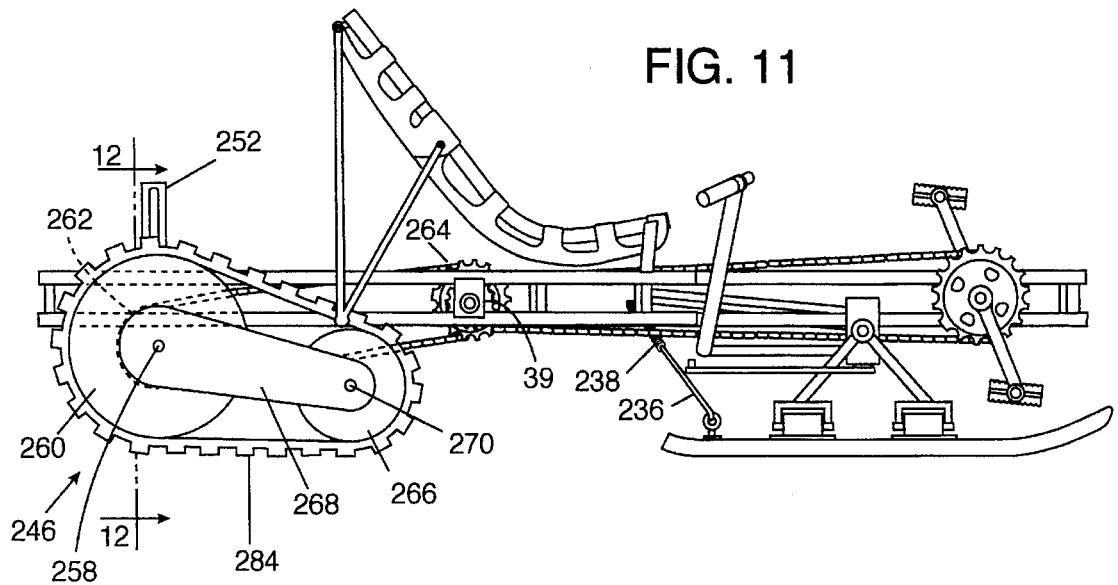
Figure 12:
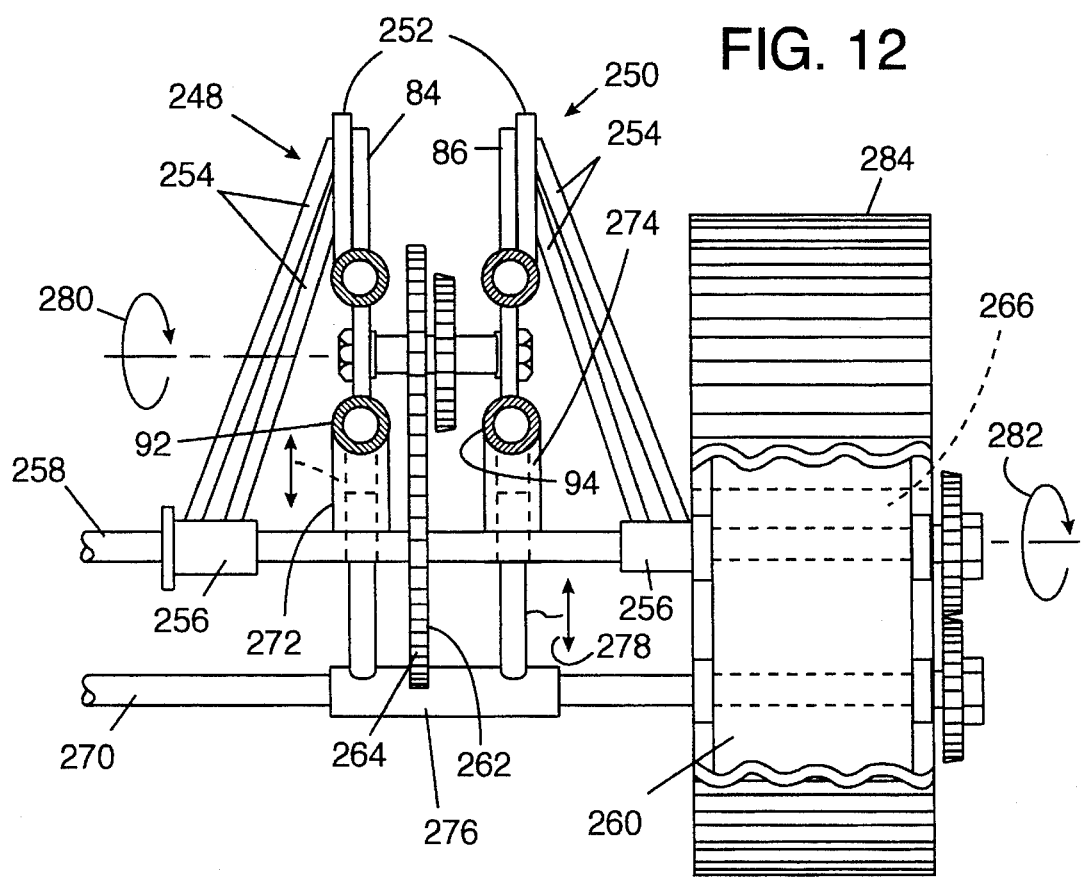

FIGS. 10–12 show the frame assembly employed in an HPRV adapted for snow. A front, steerable ski assembly 214 is shown in FIG. 10. The outrigger arm 38 terminates in the standard yoke 43 and axle 41, to which the ski bushing 216 is journaled. Forward and aft struts 218 and 220 terminate at their outboard ends in swivels 222, each of which comprise a downward facing yoke 224 which pivotably receive pivot blade 226 in turn secured to plate 228 that are secured to ski 230. An eye 232 at the aft end of the ski is connected to an eye 234 on the lower frame table 112a by a cable 236 and spring 238. This chain/spring assembly causes the ski to pivot on pins 240 and 242 (see arrow C) as the skis are turned by the steering mechanism 158, 166 and 162 (arrow A). Pivot 244 permits the ski to pivot up and down (arrow B) to follow the terrain.

FIGS. 11 and 12 show the drive mechanism 246 secured to the rear (wheel) mounting brackets 84, 86 by strut assemblies 248, 250. Each of the rear strut assemblies 248, 250 comprises a mounting plate 252 to which one or more struts 254 angle downwardly and terminate in rear axle bushing 256 which receives the rear axle 258, on the outboard ends of which are journaled drive wheel drum 260. A drive gear 262 is mounted on drive axle 258 and is driven by chain 264 from the transfer gear 39. As best seen in the side view FIG. 11, the drive wheel drum is connected to forward bogie wheel 266 by a connector plate 268. As best seen in FIG. 12, the bogie wheels are journaled on forward axle 270 which is shock mounted by shocks 272 and 274 between bearing tube 276 and the lower keel rear tubes 92 and 94. Arrow 278 shows the range of bogie motion, while arrow 280 shows the drive gear rotation and arrow 282 shows drive wheel rotation.

Optionally, rather than a connector plate 268 connecting the bogie and drive wheel, the two wheels can be connected by a chain (not shown) mounted on gears on each of shafts 270 and 258.

The drive and bogie wheels may be any light weight but durable construction, such as blow-molded hollow polyolefin drums, a rigid polyurethane foam cylinder (or disc), and the like. The polyurethane foam can be faced with wood or plastic for durability, or discs can be laminated to a round center wood or plastic plate. A cleated belt 284 is mounted on the drive and bogie wheels as shown to permit support in snow. Typically the track is laterally wider than the wheel drums to keep snow and ice out from the gap between the drive and bogie wheels. A second connector plate on the inside of the wheels may be used to assist in tracking. Skirts (not shown) depending from the connector plate(s) 268 may be used to keep snow out of the track, if desired.

Figure 13:
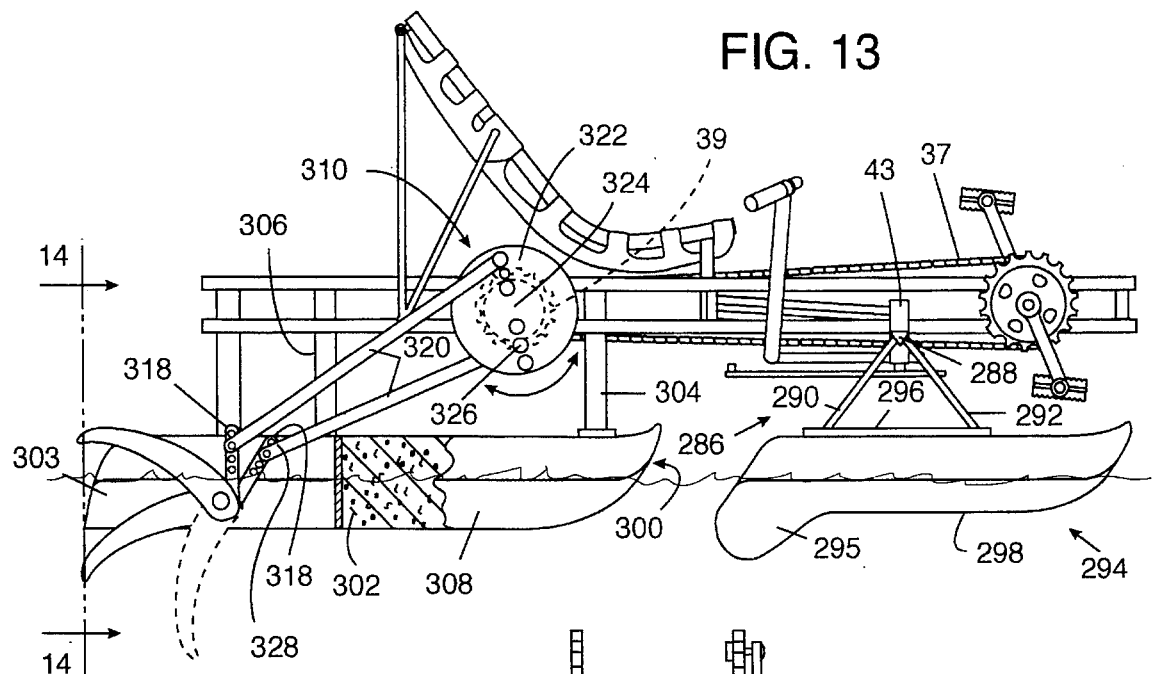
FIG. 13 and 14 show the frame assembly employed in a watercraft embodiment of a human powdered recumbent vehicle.
Figure 14:
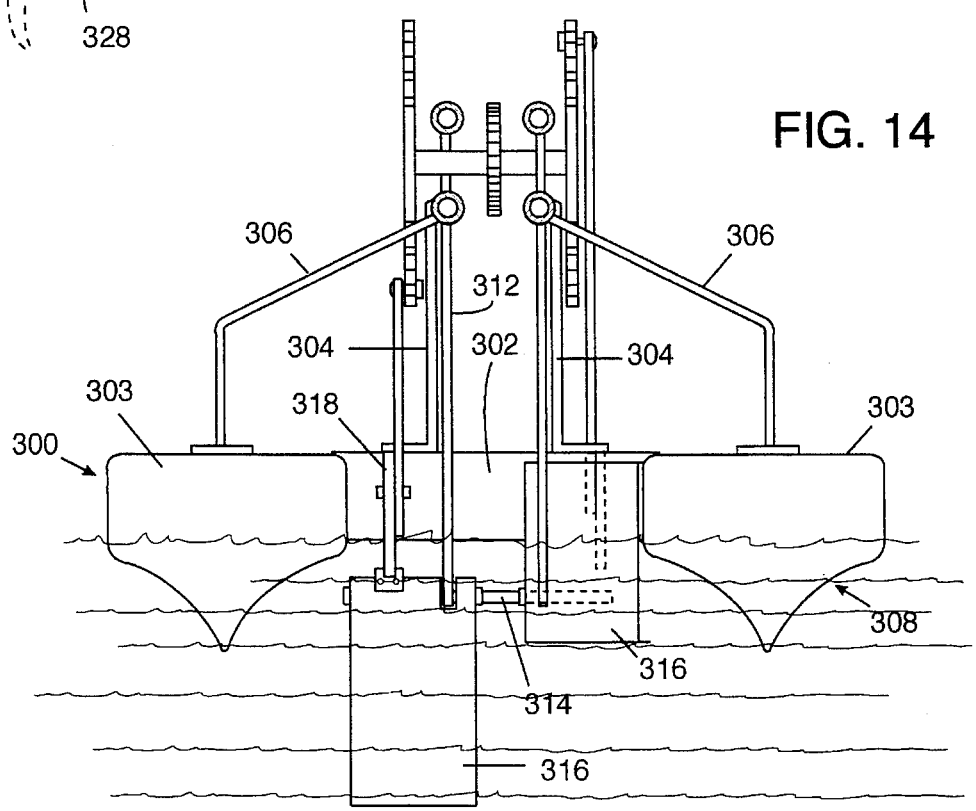

FIGS. 13 and 14 show the watercraft embodiment. Secured to each front yoke 43 is a steerable pontoon assembly 286. A strut block 288 (which need not be horizontally pivotable) carries a pair of struts 290 and 292 to the outboard ends of which is mounted a pontoon 294 via mounting plate 296. The underside of the pontoon may optionally be tapered 298, and the rear can terminate in a fin or keel 295 to permit steerage.

The rear pontoon 300 is generally U-shaped (as seen in plan view), and as seen by comparing FIGS. 13 and 14 has a forward transverse section 302 and two rearwardly extending side sections 303 outboard of the keel. The rear portion is mounted to the keel by forward brackets 304 and rear brackets 306. The pontoon may have a tapered profile 308 as best seen in FIG. 14.

A variety of drives may be used, such as a paddle wheel(s) chain driven from the transfer gear 39, propeller, or as shown, a flipper drive assembly 310. A pair of rear struts 312 are mounted to the keel at their top ends and receive an axle 314 at the bottom. Mounted on the pivot axle are a pair of paddles 316 which include on their forward ends a vertical actuating lever 318. A connector rod 320 is pivotably connected at each end between each of the levers and a drive plate 322 mounted on the outboard ends of the transfer gear shaft 324. As shown the paddles are contracting. The connector rods can be adjusted radially outwardly in holes 326 in the drive plate 322, and the length of the lever arm 318 adjusted by selecting the connector hole 328 to which the connector rod 320 is secured. The chain 37 rotates gear 39 causing the paddles to oscillate, propelling the craft. The drive plate can be infinitely adjustable by use of a diametrical slide and groove assembly which is tightenable by a bolt at the desired radial location on the plate.

It should be understood that various modifications within the scope of this invention can be made by one of ordinary skill in the art without departing from the spirit thereof. I therefore wish my invention to be defined by the scope of the appended claims as broadly as the prior art will permit, and in view of the specification if need be.

I claim:

1. A frame for a human-powered vehicle comprising in operative combination:

a central keel having a longitudinal axis;

said keel comprising a plurality of longitudinal members spaced from and generally parallel to said axis;

said longitudinal members terminating at a first forward end and at a second rearward end, the longitudinal members of said keel terminating at the forward end thereof in a common plane so that said vehicle including said frame can be stored vertically on said forward end;

a pair of outrigger arms mounted to said central keel medial of said forward and rearward ends, and oriented to diverge outwardly at equal angles from the longitudinal axis, said outrigger arms being of substantially equal length; and the divergent angle that said outrigger arms form with said keel providing access areas between each of said arms and said keel for permitting access to a seat mounted on said keel at substantially the juncture of said outrigger arms with said keel, said access areas enabling a rider to backup towards and sit on said seat without stepping over any portion of said frame.

2. A frame for a human-powered vehicle comprising in operative combination:

a central keel having a longitudinal axis;

said keel comprising a plurality of longitudinal members spaced from and generally parallel to said axis;

said longitudinal members terminating at a first forward end and at a second rearward end, the longitudinal members of said keel terminating at the forward end thereof in a common plane so that said vehicle including said frame can be stored vertically on said forward end;

a pair of outrigger arms mounted to said central keel medial of said forward and rearward ends, and oriented to diverge outwardly at equal angles from the longitudinal axis, said outrigger arms terminating in bearing tubes for receivingly engaging means for mounting wheels thereon, said keel including means for mounting a crank and gearing assembly disposed forwardly of the juncture of said outrigger arms with said keel, said frame including a bearing bracket mounted rearwardly of the juncture of said outrigger arms with said keel to receive a rear wheel, said outrigger arms being of substantially equal length; and the divergent angle that said outrigger arms form with said keel providing access areas between each of said arms and said keel for permitting access to a seat mounted on said keel at substantially the juncture of said outrigger arms with said keel, said access areas enabling a rider to backup towards and sit on said seat without stepping over any portion of said frame.

3. A frame for a human-powered vehicle as in claim 1 wherein:

a) said longitudinal members are tubular.

4. A frame for a human-powered vehicle as in 3 wherein:

a) said longitudinal members are four in number.

5. A frame for a human-powered vehicle as in claim 4 wherein:

a) said tubular longitudinal members are equally spaced from said longitudinal axis, and are cross-braced at a plurality of places along said longitudinal axis to maintain rigidity and alignment of said longitudinal members.

6. A human-powered recumbent vehicle comprising:

a frame comprising;

a keel having a longitudinal axis, said keel comprising a plurality of tubular longitudinal members arranged in a parallel array and spaced equidistantly from said axis, said longitudinal members terminating at a forward end and at a rearward end, said longitudinal members terminating at the forward end thereof in a common plane so that said vehicle can be stored vertically on said forward end;

a pair of outrigger arms mounted to said keel medial of said forward and rearward ends, said outrigger arms extending forward and oriented to diverge outwardly at equal angles from the longitudinal axis, the divergent angle that said outrigger arms form with said keel providing access areas between each of said arms and said keel for permitting access to a seat mounted on said keel at substantially the juncture of said outrigger arms with said keel, said access areas enabling a rider to backup towards and sit on said seat without stepping over any portion of said frame, said outrigger arms extending forward to provide vehicle stability, each of said outrigger arms terminating in an outboard end;

a pair of front wheels, each wheel rotationally mounted at the outboard end of said outrigger arms;

a steering assembly connected to said front wheels and coupled to said outrigger arms, said steering assembly including a transverse linkage extending beneath said keel and transversely to the longitudinal axis, said transverse linkage extending beneath said keel medial of said forward and rearward ends so that said linkage does not extend through said access areas;

a rear wheel assembly affixed to said keel for mounting a rear wheel to said keel, said assembly including a pair of mounting brackets affixed to said longitudinal members rearwardly of the juncture of said outrigger arms with said keel for receiving said rear wheel; and drive means affixed to said keel forwardly of the juncture of said outrigger arms with said keel, said drive means including at least one chain and sprocket assembly connecting a front crank with said rear wheel for multi-speed drive of said vehicle.

7. The human-powered recumbent vehicle of claim 6 wherein said outrigger arms are of substantially equal length.

8. The human-powered recumbent vehicle of claim 6 wherein said drive means comprises:

a front chain ring coupled to said crank;

dual chain ring transfer gearing mounted beneath said seat to said keel, said gearing coupled to said front chain ring with a chain for driving said gearing; and a three-speed rear hub coupled to said gearing and to said rear wheel assembly for driving said vehicle, said hub coupled to said gearing with a chain.

9. The human-powered recumbent vehicle of claim 8 further comprising means for braking said vehicle.

10. The human-powered recumbent vehicle of claim 9 wherein said braking means is selected from the group consisting of rear hub braking, rim caliper braking, rim band braking, and disk braking.

\* \* \* \* \*